United States Patent
Fric et al.

[11] Patent Number: 5,859,704
[45] Date of Patent: Jan. 12, 1999

[54] SUPERFICIAL LASER INDUCED FLUORESCENCE

[75] Inventors: Thomas Frank Fric; Robert Otto Auer, both of Schenectady; Robert Patrick Campbell, Loudonville, all of N.Y.

[73] Assignee: General Electric Company, Schenectady, N.Y.

[21] Appl. No.: 839,114

[22] Filed: Apr. 23, 1997

Related U.S. Application Data

[60] Provisional application No. 60/023,737 Aug. 8, 1996.
[51] Int. Cl.$^6$ ..................................................... G06K 9/00
[52] U.S. Cl. .......................... 356/320; 382/141; 250/365
[58] Field of Search ..................................... 356/318, 320; 250/365, 361 C, 363.02, 370.08; 382/107, 141, 260, 321; 73/861.06

[56] References Cited

U.S. PATENT DOCUMENTS 5,153,665  10/1992  Weinstein .................................... 356/28
5,249,238   9/1993  Komerath et al. ...................... 382/107

*Primary Examiner*—Hoa Q. Pham
*Attorney, Agent, or Firm*—Patrick K. Patnode; Marvin Snyder

[57] ABSTRACT

A method of superficial laser induced fluorescence for measuring film cooling performance within a fluid tunnel apparatus includes the step of introducing a test fluid uniformly dyed with a fluorescent dye into the fluid tunnel apparatus so as to surround a cooling model having a test geometry. The cooling model is positioned adjacent to a laser sheet. A background fluorescent image of the test fluid about the cooling model is recorded. The test fluid is then flushed from the tunnel apparatus. Next, a cooling simulation fluid flow and a hot gas simulation flow are introduced within the fluid tunnel apparatus. The cooling simulation fluid contains the same fluorescent dye concentration as the test fluid and the hot gas simulation fluid contains no fluorescent dye. A data image of the cooling simulation fluid flow is recorded about the cooling model as the cooling simulation fluid flow passes through the cooling model and into the hot gas simulation fluid flow. Finally, the data image is corrected using the background fluorescent image so as to determine superficial flow characteristics of the cooling simulation fluid flow passing through the cooling model.

20 Claims, 6 Drawing Sheets

SUPERFICIAL LASER INDUCED FLUORESCENCE

This application claims priority of a Provisional Application titled "Process for Measuring Film Cooling Performance," by Fric, Auer, and Campbell, Ser. No. 60/023,737 filed Aug. 8, 1996.

BACKGROUND OF THE INVENTION

This invention relates generally to gas turbines, and more particularly concerns a technique for improving measurements for gas turbine cooling systems.

To maximize efficiency and performance, gas turbines operate with internal gas temperatures far above allowable engine metal temperatures. To keep metal temperatures within acceptable limits, cooler air is typically bypassed around an engine's combustion system to be used as coolant for hot component parts. One successful cooling technique is known as discrete hole film cooling or slot cooling. Essentially, during discrete hole film cooling, cooling air is allowed to flow through small holes within the surface of the hot component part. This cooling air forms a protective "film" between the part and the hot gas flow. This technique is currently used, for example, in combustor liners, turbine blades or the like.

Accurate knowledge of the performance of this cooling film is critical. To maximize engine efficiency and minimize pollutant emissions, a turbine designer must minimize the amount of cooling air used. At the same time, the designer must use sufficient cooling to maintain metal temperatures at acceptable levels. Accordingly, the more information known about the performance of this cooling film, the better the design capabilities.

One critical measurement of film cooling performance is known as the adiabatic wall film cooling effectiveness (or "film effectiveness"), which is substantially equivalent to the concentration of film cooling fluid at the cooled component surface. The penetration, structure, and mixing of the cooling fluid are important characteristics of the flow field that ultimately influence film effectiveness.

Therefore, it is apparent from the above that there exists a need in the art for an improved measurement of film cooling characteristics such as penetration, structure and mixing of the cooling fluid and cooling effectiveness, such that better design information can be retrieved and utilized.

SUMMARY OF THE INVENTION

In accordance with the invention, a process for measuring film cooling performance utilizes a Superficial Laser Induced Fluorescence (SLIF) technique in such a manner as to measure near-surface flow patterns. A fluid tunnel apparatus includes a first flow section and a second flow section. In one embodiment of the instant invention, a cooling model having geometries of interest is positioned within the test tunnel.

A test fluid uniformly dyed with a fluorescent dye is introduced into the fluid tunnel apparatus so as to surround the cooling model. The cooling model is positioned adjacent to a laser sheet. A background fluorescent image of the test fluid about the cooling model is recorded. The test fluid is then flushed from the tunnel apparatus. Next, a cooling simulation fluid flow and a hot gas simulation flow are introduced within the fluid tunnel apparatus. The cooling simulation fluid contains the same fluorescent dye concentration as the test fluid and the hot gas simulation fluid contains no fluorescent dye. A data image of the cooling simulation fluid flow is recorded about the cooling model as the cooling simulation fluid flow passes through the cooling model and into the hot gas simulation fluid flow. Finally, the data image is corrected using the background fluorescent image so as to determine superficial flow characteristics of the cooling simulation fluid flow passing through the cooling model.

DETAILED DESCRIPTION OF THE INVENTION

Figure 1:
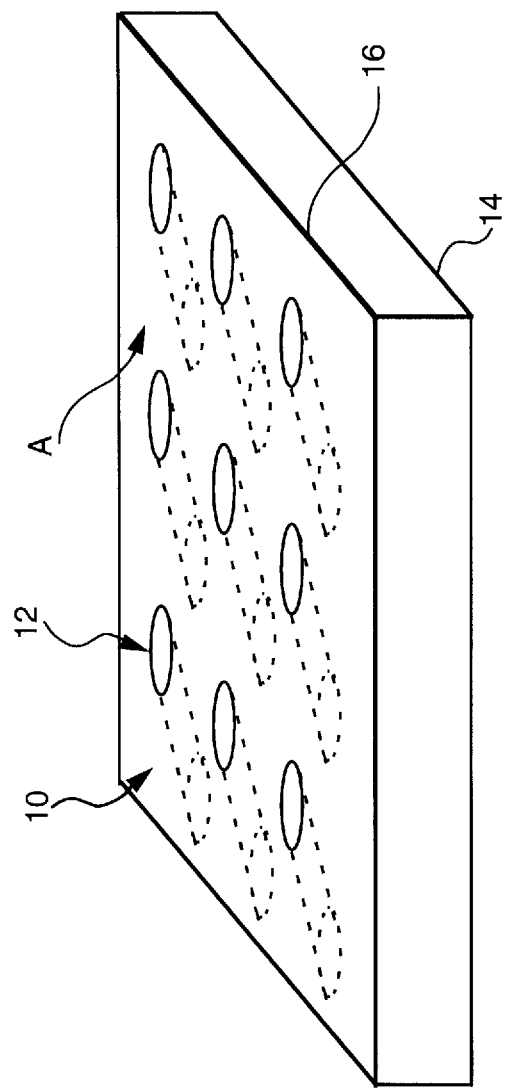
FIG. 1 depicts a typical section of a hot gas component having discrete hole film cooling.

The schematic of FIG. 1 shows a typical section of a hot gas component part 10 having discrete hole film cooling. Hot gas component 10 may include for example, combustor liners, turbine blades or the like. At least one row, or alternatively, an array of cooling holes 12 are disposed within hot gas component part 10 to provide a means to channel cooling fluid, directed, for example, along Path "A", from a relatively cooler surface 14 to a relatively hot surface 16, which hot surface 16 is to be protected by the cooling flow. One purpose of this cooling technique is to reduce the overall hot gas component part 10 temperatures by covering hot surface 16 with relatively cool fluid flow. Measurement of adiabatic surface temperature, which is approximately equal to the cooling fluid surface concentration is necessary to accurately determine film effectiveness for heat transfer design purposes.

Various flow visualization techniques are currently utilized to make a cooling flow visible. Many techniques utilize a method of flow visualization which make the test flow opaque. Techniques that make the test flow opaque, however, provide little information on internal flow structure, or vortical structure, and virtually no information on cooling fluid concentration distribution through a coolant jet. Other techniques of flow visualization make a thin cross-section of the cooling flow visible. Such techniques are much better suited to measuring concentration distributions. Measuring concentration distributions can be accomplished by seeding a test cooling flow with a dilute tracer which is visible only when the flow is illuminated. A cross-section of the flow is illuminated using a thin sheet of light. With suitable care, this technique can provide instantaneous, full-field concentration measurements.

Some test flows are seeded with a fluorescent dye. Fluorescent dyes are detectable at extremely low concentrations, so a seeded cooling flow can be almost completely transparent, thus avoiding the difficulties of opaque flow visualization techniques, as mentioned above. When stimulated by an appropriate wavelength of light, a seeding fluorescent dye of choice, fluoresces, generally at a wavelength that is different from that of the stimulating light. This wavelength difference allows an experimenter to separate dye fluorescence from scattered stimulator light by using an optical band pass filter or the like.

In accordance with the instant invention, a method of Superficial Laser Induced Fluorescence (SLIF) is used for measuring film cooling performance within a fluid tunnel apparatus. As used herein, the term "superficial" is defined as relating to surface or near-surface characteristics of a flow field, such as penetration, structure, and mixing of the flow field, that ultimately influence film effectiveness.

Figure 2:
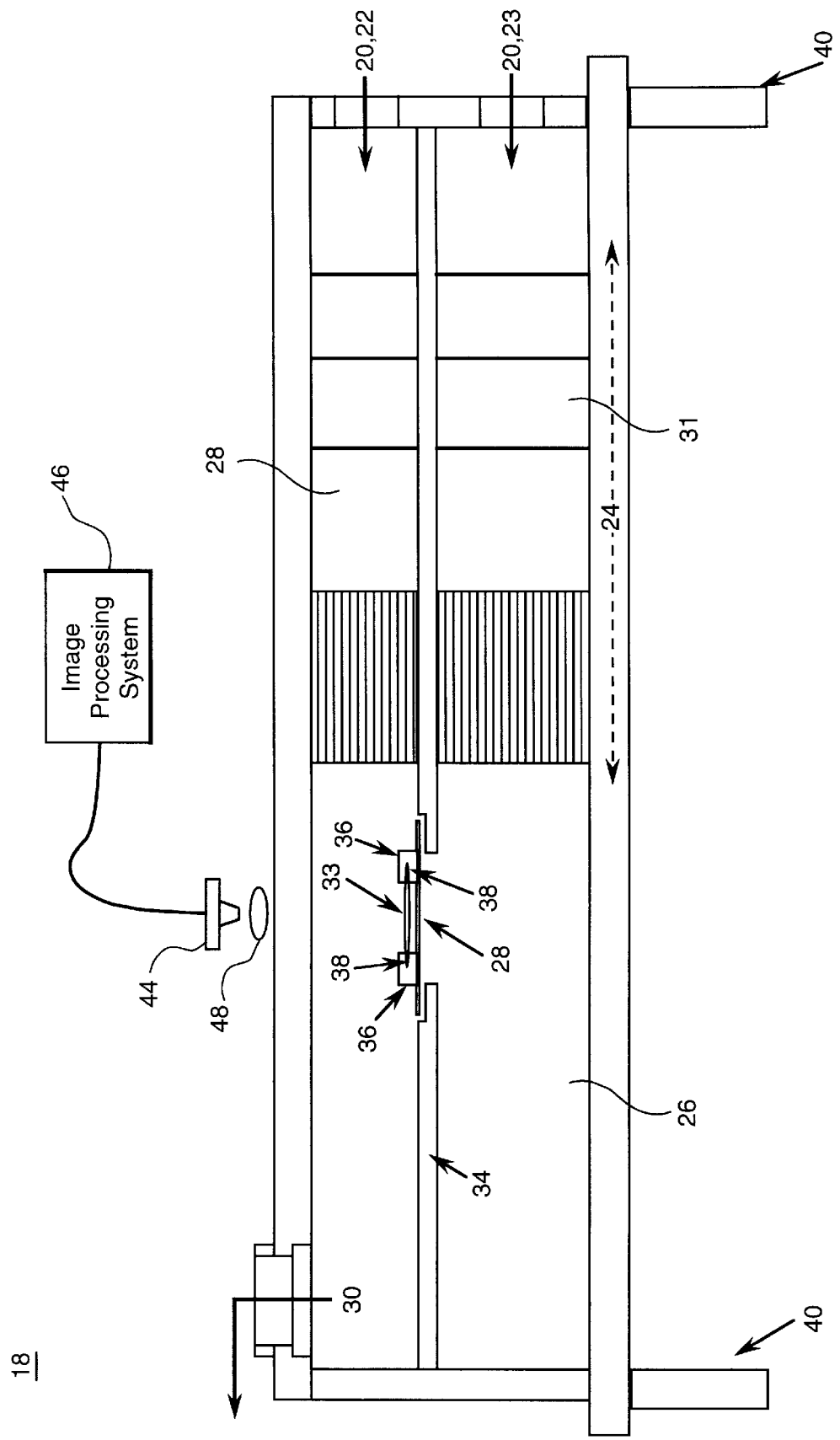
FIG. 2 is a cross-sectional side view of an experimental apparatus in which the process of the instant invention may be utilized.
Figure 3:
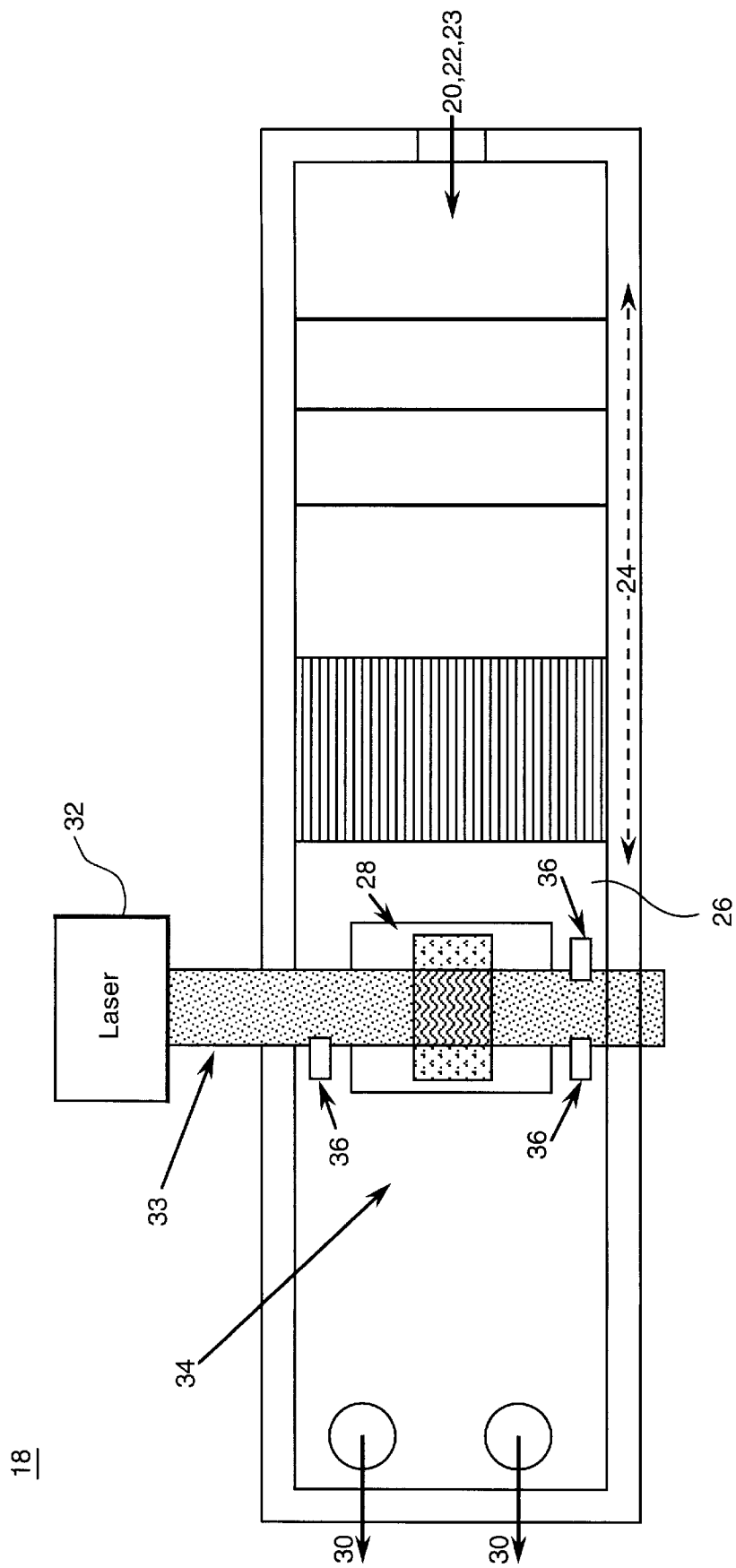
FIG. 3 is a cross-sectional top view of the experimental apparatus of FIG. 2.

An experimental fluid tunnel apparatus 18 in which the instant invention may be utilized is shown in FIGS. 2 & 3. Fluid tunnel apparatus 18 is uniformly filled with a test fluid 20 which includes a substantially uniform concentration of a fluorescent dye so as to produce comparable fluorescent output upon stimulation. As used herein, the term "test fluid" may comprise any fluid having desired characteristics such as water, air, or the like for simulation purposes.

For experiments conducted with water as the test fluid, the fluorescent dye typically comprises disodium fluorescein, rhodamine or the like. For experiments conducted with air as the test fluid, the fluorescent dye typically comprises acetone vapor, iodine vapor or the like.

In accordance with the instant invention, light produced by a laser source 32 (FIG. 3) is focused into a thin sheet of laser light 33 using lenses, mirrors, or the like, for example cylindrical or spherical lenses. The term "sheet" as used herein is defined as a portion of laser light that is relatively thin in comparison to its length and breadth. In one embodiment, laser light sheet 33 is created when laser light produced by laser source 32 (FIG. 3) is passed through a series of lenses in order to expand the light beam into a relatively narrow light sheet. Laser light sheet 33 is typically extremely narrow, typically less than about 0.010" (0.25 mm) in thickness.

In one embodiment, laser source 32 (FIG. 3) comprises a laser producing light with a wavelength in the range between about 200 nm to about 600 nm. In another embodiment, laser source 32 comprises an argon-ion laser producing light with a wavelength in the range between about 480 nm to about 520 nm. In another embodiment, laser source 32 (FIG. 3) comprises an ultraviolet laser producing a wavelength in the range between about 200 nm to about 400 nm.

Laser light sheet 33 is typically aligned so as to be substantially equidistant from a test surface 34. As used herein, the term "substantially equidistant" is defined as each point of laser sheet 33 being approximately an equal distance from test surface 34, including but not limited to experimental set-ups in which test surface 34 is a curved surface and laser light sheet 33 is curved to remain substantially equidistant, and an experimental set-up in which test surface 34 is substantially flat and light sheet 33 is substantially parallel to test surface 34.

Test surface 34 is a surface adapted to hold a cooling model 28 (the workpiece of a chosen geometry under investigation for flow characteristics) of a selected geometry and is capable of movement so as to position the selected cooling model 28 at a spaced relation with respect to laser light sheet 33 while maintaining a substantially equidistant relationship with test surface 34. In an alternative embodiment, laser sheet 33 is capable of movement, while cooling model 28 is stationary, for example when cooling model 28 is relatively large in size.

In one embodiment, a plurality of light sheet locators 36 are provided on test surface 34. In one example, as illustrated in FIG. 2, three locators 36 are disposed on test surface 34. Each sheet locator 36 comprises a slit 38 (FIG. 2) at a distance from test surface 34 at which laser light sheet 33 is to be established. This positioning of laser light sheet 33 is dependent upon the flow characteristics to be analyzed, for example, near wall flow characteristics. The positioning of test surface 34 is typically controlled by at least one micrometer actuated translation stage 40 (FIG. 2). Once the laser light sheet 33 emerges from each slit 38, laser light sheet 33 is disposed substantially equidistant from test surface 34 and the distance between test surface 34 and laser light sheet 33 can be manipulated by changing each translation stage 40 (FIG. 2) by identical lengths.

Laser light sheet 33 and test surface 34 are oriented such that laser light sheet 33 is substantially equidistant from test surface 34. Additionally, it is important that the intensity of laser light sheet 33 be kept substantially constant between each step of the instant invention. This substantially constant intensity can be achieved by monitoring the power of laser 32 (FIG. 3) and making laser power adjustments as necessary. In an alternative embodiment, the power of laser 32 is monitored and laser power corrections are made to the final measurements to account for laser power drift.

As mentioned above, a cooling model 28 of the chosen geometry is selected and is disposed on test surface 34. Cooling model 28 may comprise many shapes and sizes, so as to simulate the discrete hole cooling geometry of interest. In one embodiment, cooling model 28 is optically black so that reflections from the surface of cooling model 28 are minimized.

During use, test fluid 20 is introduced through straightening section 24 and enters into test section 26. Once tunnel apparatus 18 is filled with the uniformly dyed test fluid 20, laser light sheet 33, causes the seeded dye to fluoresce. The intensity of the fluorescence is proportional to the local intensity of laser light sheet 33 and the local concentration of the fluorescent dye.

Figure 4:
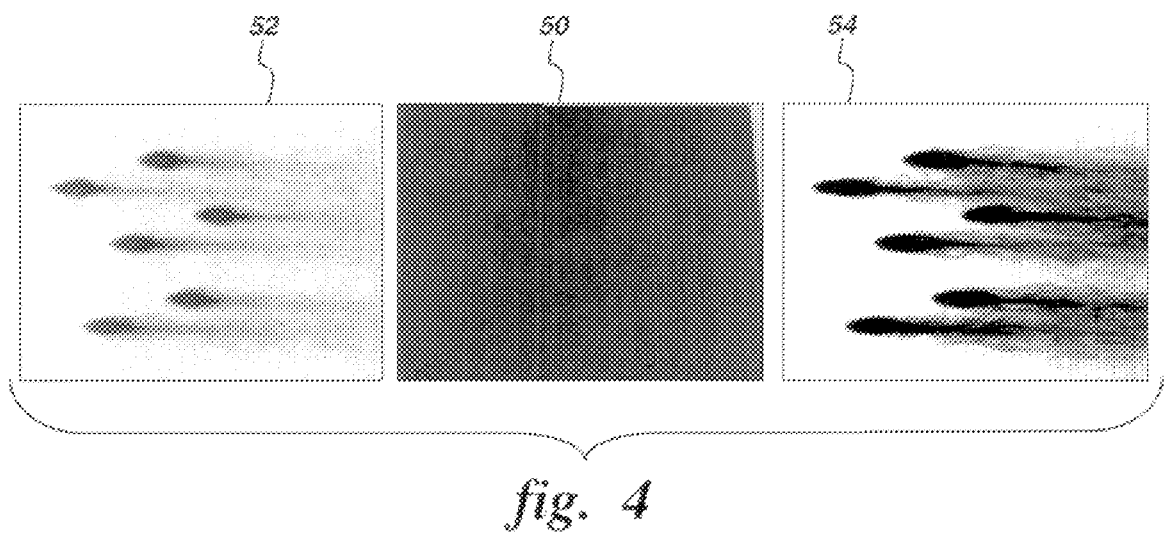
FIG. 4 shows a background image, a data image, and a corrected image in accordance with the instant invention.

A background fluorescent image 50 (FIG. 4) of the fluorescence pattern of test fluid 20 is recorded via a camera 44 (FIG. 2), typically a digital camera. Camera 44 is positioned so as to be substantially aligned with cooling model 28 and is coupled to an image processing system 46 (FIG. 2). The instant apparatus may further comprise an optical filter 48 (FIG. 2) positioned between camera 44 and cooling model 28, which optical filter 48 permits fluorescence to pass through to camera 44 while filtering out scattered laser light from laser light sheet 33. Background fluorescent image 50 is utilized to record light distribution, camera response, background or surface reflections, imperfections due to windows or optics (i.e. scratches or dust) and other external factors which may influence the output of a measured response.

Once background fluorescent image 50 (FIG. 4) is taken, test fluid 20 is directed out of fluid tunnel apparatus 18 through exhaust 30. Fluid tunnel apparatus 18 is only one example of an experimental setup for use with the instant invention, as many other types of apparatus including water tunnels, wind tunnels, airfoil cascades and flow models may be utilized.

Next, a cooling simulation fluid flow (represented generally by arrow 23) and a hot simulation fluid flow (represented generally by arrow 22) are introduced into tunnel apparatus 18.

Hot simulation fluid flow 22 and cooling simulation fluid flow 23 each pass through a straightening section 24 upon entry within tunnel apparatus 18, prior to entering a test section 26. Hot simulation fluid flow 22 passes through an upper section of 28 of straightening section 24 and cooling simulation fluid flow 23 passes through an adjacent lower section 31 of straightening section 24. The use within the instant experimental setup of a straightening section 24 having upper and lower sections is by way of example and not a limitation.

Cooling simulation fluid flow 23 has substantially the same dye concentration as test fluid 20 in the previous process steps. Hot simulation fluid flow 22 does not contain any fluorescent dye. In an alternative embodiment, cooling simulation fluid flow 23 does not contain any fluorescent dye and hot simulation fluid flow 22 has substantially the same dye concentration as test fluid 20.

Cooling simulation fluid flow 23 exits straightening section 24 and enters test section 26. Cooling simulation fluid flow 23 is directed through cooling model 28. Once through cooling model 28, the fluid of cooling simulation fluid flow 23 travels through laser light sheet 33, causing the seeded dye to fluoresce and a data image 52 (FIG. 4) of the fluorescence pattern of cooling simulation fluid flow 23 entering into hot simulation fluid flow 22, is recorded via camera 44 (FIG. 2).

In accordance with the instant invention, the digital data representing data image 52 (FIG. 4) is mathematically divided by the digital data representing background fluorescent image 50, using digital image processing system 46 or the like. A resulting corrected image 54 has values at each pixel location varying from 0 to 1, where 0 represents 0% film cooling fluid concentration and 1 represents 100% film cooling concentration.

This instant invention allows the measurement of both time-averaged and instantaneous cooling fluid concentration at any location above cooling model 28 (FIG. 3). The cooling fluid concentration measurements approach adiabatic wall film cooling effectiveness as laser light sheet 33 gets closer to cooling model 28. Laser light sheet 33 can be moved to within a very small distance of cooling model 28, typically as close as 0.010" (0.25 mm). Distances as close as 0.005" (0.125 mm) are achievable, and accordingly laser light sheet 33 grazes test surface 34 for a laser light sheet 33 thickness of 0.010" (0.25 mm).

Figure 5:
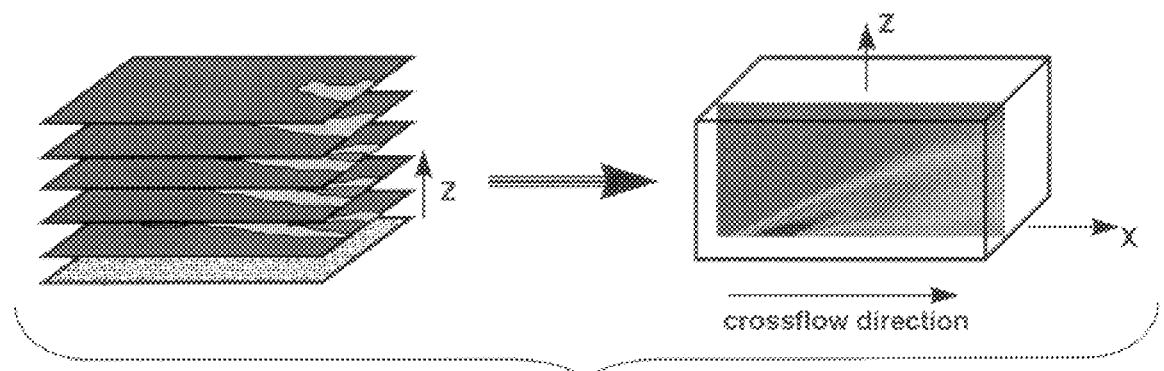
FIG. 5 shows the process by which planar data is converted into 3D data sets.
Figure 6:
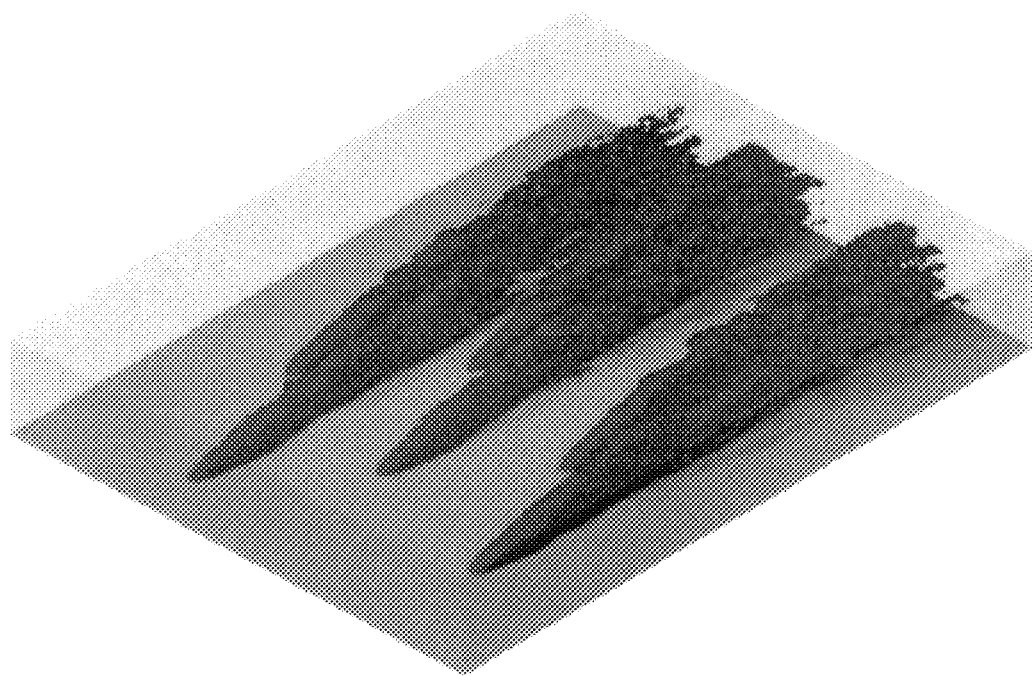
FIG. 6 shows a quantitative three-dimensional distribution of cooling fluid above a test surface.

In one embodiment of the instant invention, a number of time averaged concentration distributions are recorded at various heights above cooling model 28, as illustrated in FIGS. 5 and 6. These distribution slices can be combined using data analysis software, for example, to construct a quantitative three-dimensional distribution of cooling fluid above test surface 34. FIG. 6 shows one example of such a three-dimensional distribution. The cooling fluid flow 23 has been made visible using the data analysis software to make all of the measured concentrations higher than about 12% cooling fluid opaque so that the cooling structure is visible. Distances normal to the cooling model have been increased by about 4x. This type of quantitative, detailed, three-dimensional information about film cooling flows is important to gas turbine engineers attempting to design better film cooling systems. Images such as those shown in FIG. 6 provide data representative of film effectiveness and data showing cooling jet penetration, structure, and mixing.

EXAMPLE 1

A fluid test tunnel was utilized to quantitatively visualize film coverage from an array of discrete holes slanted 20 degrees to the surface. Superficial Laser Induced Fluorescence (SLIF) was used to measure near-wall flow characteristics. Water with low concentrations of fluorescein dye was utilized as the "cooling fluid" injected through the discrete holes supplying film cooling. The crossflow, representing the hot simulation fluid flow, was clear water.

An argon-ion laser (488 nm) and a series of cylindrical lenses were used to generate a thin laser light sheet that was positioned substantially parallel to the film-cooled model surface at prescribed heights. The laser light sheet was measured to be about 0.2 mm (0.008 in) thick. An 8-bit charge-coupled device (CCD) camera was used to capture the images. An orange #15 filter was used to filter scattered laser light. The images were digitized on a personal computer, allowing for post-processing steps for imaging correction and for planar and volumetric representation of film cooling.

Data were obtained near the cooling model surface, as close as 0.25 mm (0.01 in.). For the data to be most pertinent for heat transfer film effectiveness, it was required that superficial flow characteristics be measured. To obtain 3D images of the flow characteristics, it was required that multiples planes of data substantially parallel to the cooling model surface be measured. Prior to obtaining data, the laser light sheet was translated across the cooling model surface substantially parallel to it.

The test surface was mounted on two stages that allow for micrometer-actuated vertical positioning and tilt about the x-axis (crossflow directions). With a stage at each end of the test surface, tilt about the y-axis was also controlled. Three light sheet locators having precisely machined triangular slits, a known distance above the model surface (typically in range between about 2.0 mm to about 2.5 mm), were positioned about the cooling model. The test surface position was adjusted so that the laser light sheet passed through each slit with equivalent laser light sheet blockage, ensuring that the laser light sheet was substantially parallel to, and a known height above, the cooling model surface. For acquiring data at various heights, the vertical translation stages were moved by equivalent amounts to obtain the desired distance between the laser light sheet and the cooling model surface. The laser light sheet was estimated to be parallel to the surface to within about±0.05 mm (0.002 in.).

Superficial flow characteristics were measured for a first 10 and a second test model. Characteristics of the two models are summarized in Table 1, shown below.

TABLE 1

|  | First Model | | Second Model | |
| --- | --- | --- | --- | --- |
| Nominal Hole Diameter $D_1$ mm (in.) | 2.54 | (0.10) | 0.51 | (0.020) |
| Geometric Hole Diameter D', mm (in.) | 2.54 | (0.10) | 0.61 | (0.024) |
| Hole Length, mm (in.) | 35.4 | (1.39) | 5.8 | (0.23) |
| Number of Holes N | 6 | | 371 | |
| Discharge Coefficient Cd based on D' | 0.6 | | 0.6 | |
| Effective Diameter Deff, mm (in.) | 2.0 | (0.077) | 0.47 | (0.019) |
| Model Plate Thickness, t mm (in.) | 12.1 | (0.475) | 2.0 | (0.080) |
| Material | Aluminum | | Hast-X | |

In each case, the cooling holes were angled at 20 degrees to the cooling surface. First model had a small array of 6 holes (See FIG. 4). Second model had an array of 371 relatively small holes whose diameters were nominally five times smaller than those of first model. The cooling holes in second model supply the surface with full-coverage film. In first model the cooling holes were machined, and for the second model the cooling holes were laserdrilled.

The blowing ratios and jet Reynolds numbers for the cases investigated are shown in Table 2, below.

TABLE 2

| First Model | | Second Model | |
|---|---|---|---|
| Blowing Ratio M | Jet Reynolds number Rjet | Blowing Ratio M | Jet Reynolds number Rjet |
| 0.5 | 230 | 3.6 | 390 |
| 0.8 | 360 | | |
| 1.7 | 780 | | |
| 3.3 | 1500 | | |
| 4.4 | 2000 | | |
| 5.7 | 2600 | | |

For first model a series of blowing ratios were investigated. The Superficial Laser Induced Fluorescence (SLIF) technique allowed for the evaluation of blowing ratio effects on superficial flow characteristics such as flow field, penetration, structure, and mixing of the flow field, that ultimately influence film effectiveness.

A corrected image is obtained by dividing each pixel's value of the data image by that of the background fluorescence image, as discussed above. This procedure was followed for each plane of data above the cooling model surface. To construct a volumetric data set a total of 23 planes of data were obtained for the first model and 5 planes of data were recorded for the second model. The step size between the planes was 0.51 mm (0.020 in.).

Data are shown in the form of planar (2D) images and in the form of volumetric (3D) images. Each planar image is time-averaged data from 25 instantaneous images. The averaging was done in nearly real time on-board the frame grabber. Image processing software was used to generate a 3D interpolated data set from a series of planar images. The planar images were each substantially parallel to the model surface. FIG. 5 shows the process by which planar data is converted into 3D data sets.

For the first model, 23 planar data sets at different heights above the plate surface were taken for blowing ratios M of 0.8 and 3.3. Volumetric representations of cooling fluid flow for these two cases are therefore possible. For second model, 5 planar data sets were recorded for a blowing ratio of 3.6. All data, ranging from 0 to 1, are equal to concentrations of cooling fluid flow from the discrete holes.

One portrayal of volumetric data from first model is shown in FIG. 6. The data have been false colored such that white represents c=0 and black represents c=1. (This coloration is used for all data presented). Additionally, the optical absorbivity of the displayed information has been adjusted in the 3D data interpretation software so that for c>about 0.12 the cooling fluid flow appears opaque, and for c<about 0.12, appears nearly transparent. While FIG. 6 illustrates the value of the data volumes, specific information can be gained through viewing planar slices.

Of primary interest to a heat transfer designer is the adiabatic film cooling effectiveness at the surface. The Superficial Laser Induced Fluorescence (SLIF) technique of the instant invention is an effective way to obtain high spatial resolution data of cooling fluid concentration very close to the surface. In these experiments, the nearest laser sheet position relative to the surface was 0.25 mm (0.01 in.).

The results show that near-wall film coverage is minimum for blowing ratios from 1.7 to 3.3. At blowing ratios less than 1.7 and greater than 3.3, the film coverage was improved. Jet structure and interaction was also observed. In particular, jet separation behavior and coalescence was visualized, and both were generally a function of blowing ratio.

Although only time-averaged data were shown herein, the technique is also capable of capturing time-resolved data in any one slice. Additionally, it may be possible to relate local RMS fluctuations in blowing ratios to the local heat transfer coefficient. With the addition of high speed cameras and scanning light sheets, the technique could also be capable of measuring film cooling time-resolved in three dimensions. In addition, the data obtained by this multiple plane SLIF technique provides a set of data useful to CFD validation when computing film cooling flows.

While only certain features of the invention have been illustrated and described herein, many modifications and changes will occur to those skilled in the art. It is, therefore, to be understood that the appended claims are intended to cover all such modifications and changes as fall within the true spirit of the invention.

What we claim is:

1. A method of superficial laser induced fluorescence for measuring film cooling performance within a fluid tunnel apparatus, comprising the following method steps:

introducing a test fluid uniformly dyed with a fluorescent dye into said fluid tunnel apparatus so as to surround a cooling model having a test geometry, said cooling model being disposed adjacent to a laser sheet;

recording a background fluorescent image of said test fluid about said cooling model;

flushing said test fluid from said fluid tunnel apparatus;

introducing a cooling simulation fluid flow within said fluid tunnel apparatus, said cooling simulation fluid having substantially the same fluorescent dye concentration as said test fluid;

introducing a hot gas simulation fluid flow within said fluid tunnel apparatus, said hot gas simulation fluid flow having no fluorescent dye;

recording a data image of said cooling simulation fluid flow about said cooling model as said cooling simulation fluid flow passes through said cooling model and into said hot gas simulation fluid flow;

correcting said data image with said background fluorescent image so as to determine superficial flow characteristics of said cooling simulation fluid flow passing through said cooling model.

2. A method in accordance with claim 1, wherein said flows are uniformly dyed with disodium fluorescein.

3. A method in accordance with claim 1, wherein said flows are uniformly dyed with acetone vapor.

4. A method in accordance with claim 1, wherein said flows are uniformly dyed with rhodamine.

5. A method in accordance with claim 1, wherein said flows are uniformly dyed with iodine vapor.

6. A method in accordance with claim 1, wherein said laser sheet is produced by a laser producing light with a wavelength in the range between about 200 nm to about 600 nm.

7. A method in accordance with claim 1, wherein said laser sheet is produced by an argon-ion laser producing light with a wavelength in the range between about 480 nm to about 520 nm.

8. A method in accordance with claim 1, wherein said laser sheet is produced by an ultraviolet laser producing a wavelength in the range between about 200 nm to about 400 nm.

9. A method in accordance with claim 1, wherein said cooling model is a curved surface and said laser light sheet is curved to remain substantially equidistant therefrom.

10. A method in accordance with claim 1, wherein said cooling model is flat and light sheet is positioned substantially parallel to said cooling model.

11. A method in accordance with claim 1, wherein said laser light sheet is disposed substantially parallel to said cooling model and within the range between about 0.005 inches to about 0.020 inches to said cooling model.

12. A method in accordance with claim 1, wherein said cooling model is optically black so as to minimize surface reflections from said laser sheet.

13. A method in accordance with claim 1, wherein said fluorescent images are recorded via a digital camera.

14. A method in accordance with claim 13, wherein said digital camera is coupled to an image processing system.

15. A method in accordance with claim 1, wherein said correcting said data image with said background image comprises mathematically dividing said the digital data representing data image by the digital data representing background fluorescent image using a digital image processing system.

16. A method in accordance with claim 1, wherein said method includes the additional step of recording a plurality of time averaged concentration images at respective heights above said cooling model.

17. A method in accordance with claim 16, wherein said plurality of time average concentration images are combined so as to construct a quantitative three-dimensional distribution of said fluids above said cooling model.

18. A method in accordance with claim 17, wherein said construction of said quantitative three-dimensional distribution is made using data analysis software.

19. A method in accordance with claim 1, wherein at least three light sheet locators are provided on said test surface, each of said light sheet locators comprising a slit at a known distance from said test surface so that positioning of said laser light sheet within said slits ensures said laser light sheet is substantially parallel to said test surface.

20. A method of superficial laser induced fluorescence for measuring film cooling performance within a fluid tunnel apparatus, comprising the following method steps:

introducing a test fluid uniformly dyed with a fluorescent dye into said fluid tunnel apparatus so as to surround a cooling model having a test geometry, said cooling model being disposed adjacent to a laser sheet;

recording a background fluorescent image of said test fluid about said cooling model;

flushing said test fluid from said fluid tunnel apparatus;

introducing a hot gas simulation fluid flow within said fluid tunnel apparatus, said hot gas simulation fluid having substantially the same fluorescent dye concentration as said test fluid;

introducing a cooling simulation fluid flow within said fluid tunnel apparatus, said cooling simulation fluid flow having no fluorescent dye;

recording a data image of said cooling simulation fluid flow about said cooling model as said cooling simulation fluid flow passes through said cooling model and into said hot gas simulation fluid flow;

correcting said data image with said background fluorescent image so as to determine superficial flow characteristics of said cooling simulation fluid flow passing through said cooling model.

* * * * *